United States Patent [19]
Coira Castro

[11] 3,884,371
[45] May 20, 1975

[54] MECHANISM FOR VARYING THE DISTANCE BETWEEN CAGES MOVABLE IN AN ENDLESS PATH

[76] Inventor: Patricio Coira Castro, Avda. Pio XII, 35, Pamplona, Spain

[22] Filed: Jan. 21, 1974

[21] Appl. No.: 434,901

[52] U.S. Cl. ......... 214/16.1 BB; 198/110; 198/154; 198/137
[51] Int. Cl. .............................................. E04h 6/06
[58] Field of Search. 214/16.1 BB, 16.1 B, 16.1 BA; 198/110, 154, 158, 137, 138

[56] References Cited
UNITED STATES PATENTS
| | | | |
|---|---|---|---|
| 3,166,180 | 1/1965 | Sonderegger | 214/16.1 BB |
| 3,410,426 | 11/1968 | Fehlmann | 214/16.1 B |
| 3,795,328 | 3/1974 | Buttironi | 214/16.1 B |

*Primary Examiner*—Robert J. Spar
*Assistant Examiner*—R. B. Johnson
*Attorney, Agent, or Firm*—Friedman & Goodman

[57] ABSTRACT

The present invention relates to improvements introduced into wheels transporting cages with mechanisms for varying the distance between cages, consisting essentially of a fixed supporting structure where provision has been made for two pairs of rails, one for each row, on which there are supported and over which there slide hangers from each of which is suspended a cage of approximate dimensions to contain an automobile or objects to be stored; each hanger is joined to the anterior and posterior one by independent lengths of cables which are joined to one another by means of a distance-varying mechanism housed in each hanger, so that the complex of cages can move without interruption, being supported on the corresponding rails, which are longitudinal with respect to the installation, and can change level and direction of movement by means of pulleys duly driven by appropriate elements situated at the ends of the structure.

3 Claims, 3 Drawing Figures

MECHANISM FOR VARYING THE DISTANCE BETWEEN CAGES MOVABLE IN AN ENDLESS PATH

The purpose of the present invention is to improve and simplify the distance-varying mechanism between cages arranged in two super-imposed horizontal rows, which cages are suspended from a suitable structure, with the possibility of having an uninterrupted forward movement thanks to the application of end pulleys endowed with appropriate drive elements duly controlled for starting and stopping.

Such a structure can have a variety of applications, among which may be mentioned, for example automobiles, which are arranged in two super-imposed rows: this makes it possible for any car to be caused to face a loading or unloading platform, there thus being created a system of parking which, for one and the same working surface, doubles its capacity.

In general, a wheel of this type essentially consists of a fixed supporting structure where provision has been made for two pairs of rails, one for each row, on which there are supported and over which there slide hangers from each of which is suspended a cage of appropriate dimensions to contain an automobile or objects to be stored; each hanger is joined to the anterior and posterior one by independent lengths of cables which are joined to one another by means of a distance-varying mechanism housed in each hanger, so that the complex of cages can move without interruption, being supported on the corresponding rails, which are longitudinal with respect to the installation, and can change level and direction of movement by means of pulleys duly driven by appropriate elements situated at the ends of the structure.

In order that the cages may change level by means of the end pulleys, it is necessary for them to maintain between them a given distance so that they do not bump into one another, while in the rest of the linear travel this separation is not necessary, for the varying mechanism situated on top of the hanger for the purpose of bringing the cages nearer to one another acts in order that maximum advantage may be taken of the space available; on the other hand when a cage approaches an end pulley in order to ascent or to descend, the mechanism of the hanger should operate in the inverse sense, that is to say by separating consecutive cages at the distance necessary to be able to effect the next revolution without any interference.

The purpose of the present invention is essentially to improve the distance-varying mechanisms between cages with the result that in both rows, which are circulating without interruption, the cages are balanced when they go over the driving pulleys to change level thanks to the compensation of approaching and separating, the result being that a constant total length is obtained.

The variation of distance is obtained by means of a sliding mechanism which is automatically driven by suitably arranged guide or other appropriate elements which permit the movement of the slide elements to shorten or lengthen the stretches of cable that haul the following hanger, so that the cages concerned approach one another or become separated from one another in due fashion.

With the aim of making the object of the invention more easy to understand, in the attached drawings which complement this description there is shown a practical form for industrial embodiment, but only by way of example and, consequently, without an exhaustive but with a merely informative character.

Figure 1:
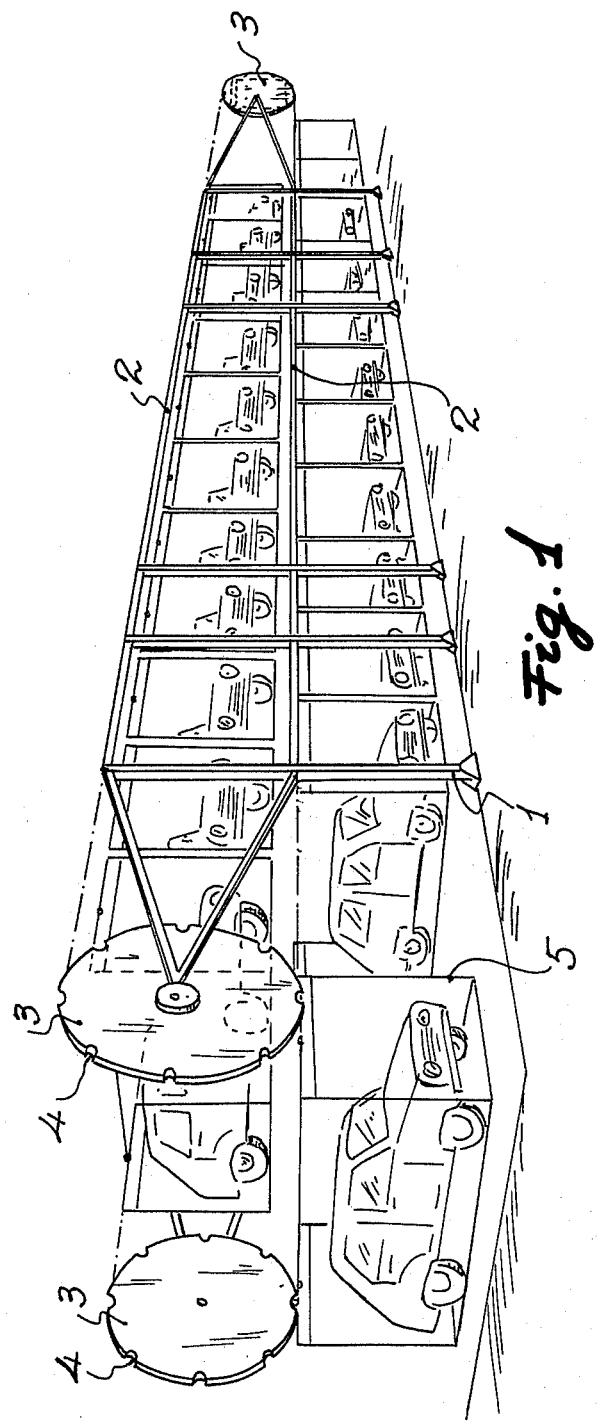
FIG. 1 shows a schematic perspective view of the complex of the wheel transporting the cages in accordance with the invention.

As shown in FIG. 1, the wheel of cages consists of a structure 1 arranged in two parallel fronts, which structure is endowed with upper and intermediate longitudinal members which have longitudinal rails on which there are supported and over which there slide hangers 6 from which are suspended, respectively, the cages 5, usable for the storage of automobile vehicles or other heavy objects; at the end of the structure, pulleys 3 are situated, endowed with peripherical notches 4 of semi-circular section, which constitute the hauling system of the wheel for which, the said pulleys are suitably connected to an appropriate drive system by well known methods, incorporating, as is natural, a control system for the starting or stopping of the moving complex so that the cages circulate without interruption, forming two super-imposed rows, being supported on the rails of the longitudinal members 2 and changing level by means of the pulleys 3 on reaching the ends.

Figure 2:
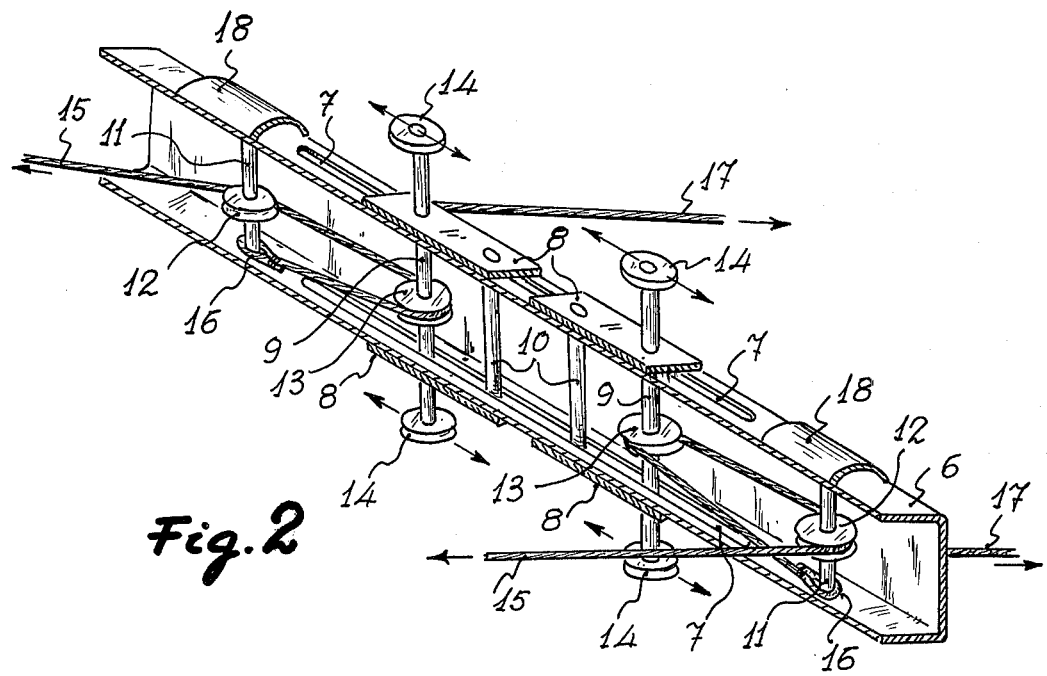
FIG. 2 shows a perspective view of a hanger in which the slide mechanism for varying the distances between the cages is incorporated.

Each hanger 6, FIG. 2, is joined to the anterior hanger by the cables 15 coming from the slide mechanism, and is joined to the following hanger by the cables 17 anchored to the hanger 6 so that a perfect engagement of the moving system is obtained without interruption.

Figure 3:
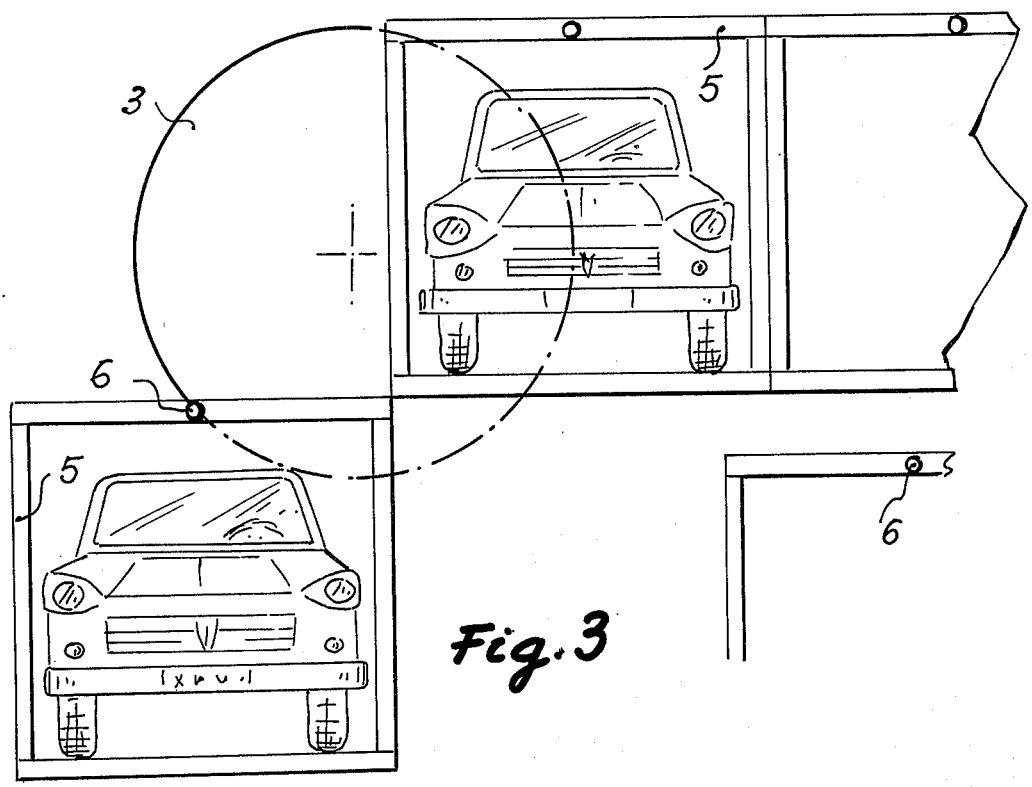
FIG. 3 shows a sketch of minimum turning conditions of the end pulleys.

As shown in FIG. 3, in order that the cages 5 may change level by means of the end pulleys 3, it is necessary to establish between the cages at the stage when they change direction and between the immediately superior and inferior cages a given distance in order to keep the cages from bumping into one another; in the rest of the linear travel this separation is not necessary for the slide mechanism of the hanger 6 causes the cages to approach one another.

On the other hand, when a cage 5 approaches the corresponding pulley 3, either in ascending or descending direction, the hanger mechanism 6 operates in an inverse sense, separating consecutive cages at a distance necessary to be able to effect the next revolution without hindrance.

These movements are produced at the upper and lower parts simultaneously the result being that, thanks to the compensation of approaching and separating, an invariable total length complex is obtained.

This complex is driven in accordance with conventional systems. In general, the hauling is effected by the end pulleys 3, on whose periphery provision has been made for notches 4 in which there are coupled curved surfaces 18 existing in the hangers, FIG. 2, constituted by a semi-cylindrical or preferably a cylindrical bushing which envelops the hanger 6 near its ends, it being necessary for the complex to be dimensioned so that at any time there will be a hanger 6 engaged in each pair of pulleys 3 with the aim of the wheel being perfectly balanced.

The drive of these pulleys is effected by means of chains, gears, etc., which transmit movement from a suitable source of energy to start the complex moving.

The necessity for simultaneous movement of the four pulleys 3 is satisfied by the connection of all of them to one and the same drive element through appropriate transmission gear or by using synchronized electric motors coupled to each pulley 3.

In this way, at any time a given cage may be situated on the lower level and at one of the ends or at any other place where provision has been made for a loading and-/or unloading platform.

The hanger 6 is the fundamental element for supporting the cage 5 in which are contained the stored objects, to which hanger, of a new design, this invention principally refers.

It consists of a resistant body 6 of appropriate variable profile that may have a circular tabular or a square section, or may be formed by a combination of other shapes, although the preferred shape is that shown in FIG. 2, corresponding to a U-shaped laminated profile with the core situated in a vertical direction. Generally speaking, the said hanger 6 is slightly longer than the cage 5, provision being made near the ends for the cylindrical surfaces 18 which are intended to fit the notches 4 of the pulleys 3, FIG. 1; at the ends of this body 6 there are connected rolling or sliding carriages (not shown) which are supported during horizontal movement on the rails or guides included in the longitudinal members of the structure.

Near the end of the hanger 6 provision has been made, in a vertical direction, for two shafts 11, fixed between the wings of the profile 6 having a pulley in their middle zone 12; in the intermediate zone of the hanger 6 there are symmetrically situated two systems of sliding elements constituted by upper and lower outer plates 8, which can slide longitudinally over the slide elements; for this purpose facing grooves 7 have been provided in the upper and lower planes of the profile 6, their length being limited in the proximity of the end cylindrical surfaces 18; through the said grooves 7 there is provided for each set of slide elements 8 a guide shaft 10 and a bushing shaft 9 by means of which a connection is established between the corresponding upper and lower plates 8 in such manner that they may move, being guided by the grooves; the arrangement of the said shaft 9 and 10 is symmetrical, and they are preferably situated immediately proximate to the guide shafts 10; in the centre of the bushing shafts 9 a pulley 13 is fitted with sheaves 14 on its outer ends.

The purpose of this mechanism is to serve as a governor for the two branches of cable 15, whose ends 16 are anchored to the lower part of the fixed shafts 11 and then pass through the pulley 13 of the shaft 9 and subsequently through the pulley 12 of the fixed shaft 11 guiding the branches of cable 15 in a direction perpendicular to the hanger 6 towards another immediate hanger, while at the opposite part of the hanger 6 the ends of two other branches of cable 17 are anchored, the said branches coming from another immediately previous hanger, in such a way that in accordance with the movement of the slide elements 8 a shortening or lengthening of the branches of cable 15 which haul another hanger is achieved.

The purpose of this slide mechanism is that of serving as a governor for the cable 15, and this operation may be effected with different guide, fixing, tensing and multiplying elements.

In the structure 1 of the installation there are fitted on the upper and intermediate parts two guides of suitable form and material, not shown in the drawings, so that there may be supported on them the sheaves provided at the ends of the bushing shafts 9, there thus being fixed the symmetrical position of the slides 8 with respect to the centre of the body of the hanger 6, whose position may be adjusted as will: in this way, when maximum separation of the cages is required, the bushing shafts 9 will be at the corresponding ends of the groove 7, providing the branches of cable 15 with a greater length; the said sliding of the slide elements 8 is produced by an appropriate deformation of the guides on which the sheaves 14 are supported, thus facilitating the turning movement of the cages 15, without any hindrance, over the pulleys 3 of the structure 1. Once the operation of the change of level of the said cages 5 has terminated, the slide elements are caused to move by the respective bushing shafts 9 in conjunction with the sheaves 14 directed by the guides themselves, which have been appropriately deformed, or by other mechanical, electrical or hydraulic means, and to occupy the centre of the hanger, with the result that the lengths of the branches 15 will have been shortened by twice the travel of the bushing shaft 9 by virtue of the double turn of the anchorage end of the cables 15. This said travel may be extended or reduced in accordance with a greater or lesser multiplication obtained by a different position of the pulleys 12 and 13 that guide the cable 15.

This new position of minimum distance between cages 5 is maintained by means of the guide or other system applied, and permits the hanger 6 to continue to operate, hauled by the driving system of the wheel, but always with the same admissible distance between cages.

The nature of the invention having been sufficiently described, together with a practical example of its embodiment, it only remains to add that changes of the materials, forms and arrangement of the elements of the invention may be made, provided that such alteration does not imply any substantial variation in the purpose of the invention.

What is claimed is:

1. Improvements introduced into wheel transporting cages, with a mechanism for varying the distance between cages, of the type that consists of a supporting structure for a plurality of cages arranged in two superimposed horizontal rows, very close together in the straight stretches, each cage being joined to a mechanism for varying distances between them, which mechanism produces an increase or a reduction of the separation between the said cages before or after their passage over the end pulleys of the wheel in either of the cases in which a cage begins its ascent towards the upper level, or its descent towards the lower level, following a curved line determined by the rim of the said pulleys, to avoid a cage being contacted by the cage immediately it in a straight line, the cages being hauled by branches of cable that link the respective distance-varying mechanisms constituted in the hangers of the cages, the said improvements are characterized because the distance-varying mechanism of each cage is integrated into a hanger of the cage in question, which hanger consists of a resistant profile arranged at right angles with respect to the direction of forward travel of the cages, and is fitted on the exterior with two cylindrical elements near the ends, designed to be joined to notches made in the rims of the driving pulleys; in the said hanger, provision has been made for two facing longitudinal grooves on the upper and lower zones, which grooves serve as guides for sliding elements constituted by two plates external to the hanger, each pair of plates being linked by two vertical bushing shafts passing through the grooves in such a way that the said plates can slide being perfectly guided by the facing grooves; one of these shafts of each sliding element is extended at both ends, each of which carries a sheave, while in the middle zone there is a pulley over which there passes the end of a branch of traction cable coming from another hanger immediate to it, which cable has previously passed through another pulley fitted on a fixed vertical shaft near the end of the hanger, to which hanger the end of the cable is anchored, so that a movement towards the centre of the sliding element will produce shortening of the branch of the cable fixed to a hanger that is immediate to it, while if the sliding element moves towards the end, the said branch will be lengthened, thus producing a greater distance between hangers.

2. Improvements introduced into wheels transporting cages with a mechanism for varying the distance between the said cages, in accordance with claim 1, characterized in that the two sliding elements of one and the same hanger, present a symmetrical position with respect to the centre of the said hanger so that they will produce the same shortening or lengthening of the respective branches of cable simultaneously on their moving over the guide grooves, the said branches being kept parallel by the end pulleys fitted on the corresponding fixed shafts.

3. Improvements introduced into wheels transporting cages, with a mechanism for varying the distance between the said cages, in accordance with claim 1, characterized in that the sheaves fitted on the extended ends of the bushing shafts, fitted with a pulley, of each sliding element are capable of remaining in contact with guides made in the upper and intermediate parts of the structure of the wheel in such a way that the said guides maintain the sliding elements permanently near the centre of the hanger during the straight-line travel of the cages, maintaining the said cages practically in juxtaposition, while in the proximity of the driving pulleys the said sheave guides are deformed with the aim of moving the sliding elements to the corresponding ends of the slide grooves, obtaining a greater length of the branches of cables with the resultant greater separation between cages, the distance being reduced when the movement of the cages again adopts a straight line direction.

* * * * *